April 26, 1960 E. F. PETERSON 2,933,786
BLOW TUBE FOR CORE BLOWING MACHINES
Filed May 13, 1957

Edwin F. Peterson
Inventor

By

2,933,786
BLOW TUBE FOR CORE BLOWING MACHINES

Edwin F. Peterson, Neponset, Ill.

Application May 13, 1957, Serial No. 658,824

5 Claims. (Cl. 22—10)

My present invention relates to blow tube for core-blowing machines, and method of making same; and more particularly to a nylon blow tube, and the method of cold forming a nylon or nylon like tube to fabricate same into a predetermined geometrical shape to fit holes in blow plates of core making machines in a desirable new manner.

The present invention is, as regards the item per se, an improvement over my prior patented blow tubes disclosed in patents numbered: 2,607,968; 2,637,881; 2,659,119; 2,687,559; and 2,761,186.

Nyon is presently preferred for the item; however, it is to be understood that other known plastics, as well as those to be discovered, may possess abrasion resistance properties of substantially equal characteristics, and hence the phrase nylon like will appear hereinbelow to embrace such equivalent materials. Nylon is the generic name for a group of thermoplastic materials defined chemically as polyamides and occur in several different types, often bearing a trade name and number to identify same. It is to be noted that different types are normally formed in present practice in temperature ranges from 450 to 600 degrees Fahrenheit.

It is intended to make use of those types of nylon and nylon like materials that have the highest resistance to abrasion; and to form therefrom a blow tube shaped to further reduce abrasion inherently present in the transfer of sand, or the like, such as used to make cores. The blow tube is not necessarily restricted to the method to be described in detail below; but could be molded or machined in known manners. It has been found that a properly shaped thin walled nylon blow tube will serve in use approximately four times longer than the best synthetic rubbers previously used in my prior blow tubes. Such long life results in a substantial saving in useful time of a molding machine because replacement of blow tubes is required at substantially less frequent intervals. In addition, the rubber tubes are thicker and require larger holes for mounting also.

Accordingly, a broad object of this invention is to provide a nylon blow tube shaped in predetermined manner to provide long useful life of same.

Another broad object is to provide a method of cold forming a nylon tube, or the like, in a predetermined manner and/or shape to fabricate a blow tube.

A further object in keeping with the above objects is to provide a nylon blow tube with a cut off lip, or the like, to prevent the formation of stems on the core.

Another broad object resides in permitting very carefully defined movement of a blow tube to improve the snapping off of stems within close tolerances.

Other objects and advantages reside in the details of the item and in the steps of forming the item, and will be either obvious or pointed out in the following specification and claims.

Figure 1:
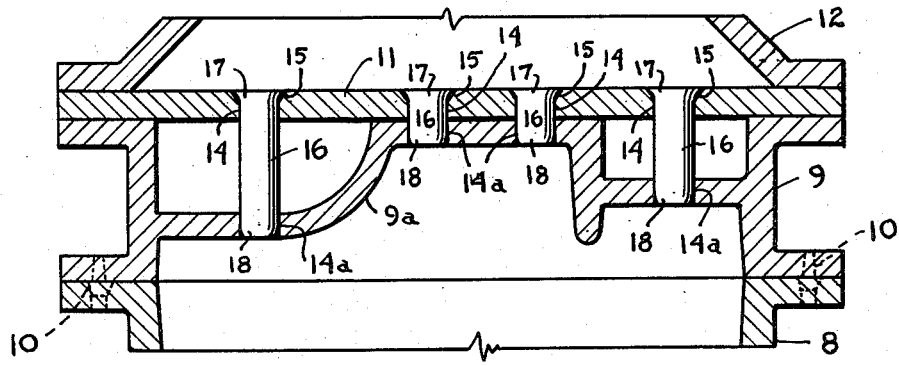
Fig. 1 shows the item in a blow plate.
Figure 2:
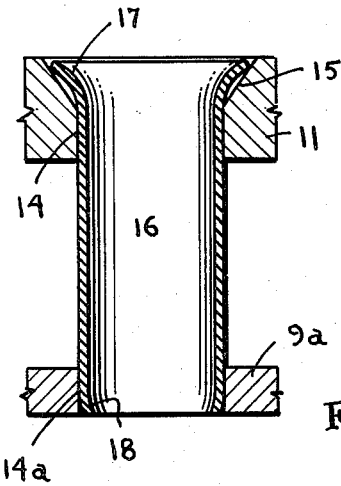
Fig. 2 is a longitudinal half section of the item.

Referring more in detail to the drawing; in Fig. 1 a core box drag 8 is moved in known manner up to a cope 9 fastened to a plate 11 forming the bottom wall of a conventional core blowing machine magazine 12. Pins 10 guide the mating of the drag 8 and cope 9. The blow plate 11 is provided with one or more holes 14 which may be drilled in the plate and counter drilled at the tops at 15 to provide a tapered entrance port. Holes 14a in a top wall 9a of the cope 9 are in axial alignment with the holes 14 to receive blow tubes of suitable length which have bottom or outlet ends substantially flush with the lower surface of the wall 9a. As will appear below, the tubes to be described in detail are adapted to feed core sand (or similar material) by transferring same in a high velocity stream of air into the cavity within the drag 8 and the cope 9, which form the core box.

A nylon blow tube 16 is preferably frictionally mounted in the hole 14 and is formed from a tube of nylon that has sufficient diameter to provide a tight friction fit in the hole 14. The tube 16 is pressed down into the hole 14 until a curved flange 17 thereof is in intimate engagement all around the sides of the tapered upper portion 15 of the hole 14. Air pressure is provided to core sand in the magazine 12 to cause the sand to be pushed and carried into the cavity in the core box. The flange 17 under such pressure will be urged further slightly downwardly to provide an airtight seal at the point of contact with the tapered wall. Accordingly by using the blow tube 16, the machining of the hole 14 need not be held to close tolerances while still retaining a suitable high quality of core, which constitutes a further advantage of this invention.

In theory, it is expressed that the best cores are blown most economically when each particle of core sand is surrounded by air. However, it is also observed that the minimum use of air will also result in economy of operation. Accordingly, the air and sand are most favorably constrained to flow in a streamlined manner into the inlet flange 17 which is curved to form a bell mouthed entrance. The particular details concerning radius of curvature (or generation of non uniform curvature) appears to be of lesser importance than the fact that curvature be provided. The item disclosed has a radius of curvature that is approximately 25% of the radius of the tube 16. Smaller and larger radii also appear to operate substantially identically. Accordingly, this disclosure may be concerned with the other features of the flange 17, i.e., sealing, abrasion reduction, and positioning the tube 16 in the hole 14, with a convenient slope in the tapered portion of the hole 14.

With prior blow tubes it is observed that some wear down most rapidly at the points of entry of the sand and air to render them inoperative for at least one purpose intended, that is preventing abrasion of the blow holes in the blow plate. Because sand and air enter the present blow tube with an inflow of same from the periphery of the flange 17 toward the center of the blow tube 16, the velocity and direction of flow over the flange 17 is lower and at a more favorable angle of impingement than in prior blow tubes. The causing of tangential sand and air flow by the flange 17 is an additional advantage thereof, and permits of construction of the blow tubes 16 from thin walled nylon tubes while still maintaining long life thereof.

Another advantage of this invention resides in the reduction of the formation of undesired stems on the formed cores. Prior blow tubes have been provided with rubber or rubber like restrictions at their outlets. Such would expand and contract due to compression of the lip to bite off the stems and hold them while the core box was removed. The present invention being made of nylon selected for abrasion and corrosion resistance does not have the compressibility or flow of rubber. However it is found that a restriction in the present device has the desirable function of removal of stems. It is thought that the following may be the reason; although this may not actually be the inherent reason is set forth as an example only.

There is from five to ten pounds of air pressure differential between the cavity in the core box and in the magazine. Such pressure causes sand and air to flow at high speeds probably near the speed of sound and tending to cause noise and/or vibration in the blow tube 16. Because the tube is confined by the hole 14 over its major top dimension, only a bottom constricted outlet 18 is free to vibrate. Such vibration will occur at very high sound frequencies due to the geometry of the blow tube 16 and the outlet 18. It is observed that the stems are sheared off very cleanly approximately in a plane containing the lowermost lip of the outlet 18, which is a further desirable function because smoother cores result. Accordingly, it is deduced that the lip vibrates at some high sound frequency at least in substantial part in a plane normal to the longitudinal (vertical) axis of the blow tube 16. Such vibration will cause condensations and rarefactions of the air and sand mixture passing therethrough. Such because of pulse packing in, will result in better sand distribution or uniformity of core, as well as the above pointed out clean shearing and pick off of stems from the core.

*A method of cold forming the blow tube*

As pointed out above, many known techniques can be employed to make blow tubes 16 such as disclosed above, in one preferred form only. However, a fast and simple technique for forming blow tubes, as well as other items, has been discovered; and will now be described in a general way only. It will be understood that jigs, tools, and the like, within the ken of those skilled in the art will also reside within the scope of the subjoined claims.

Figure 3:
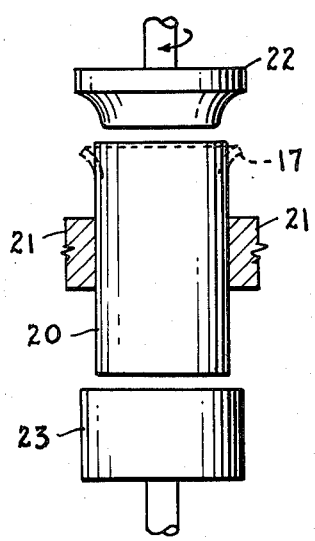
Fig. 3 shows a first step in forming the item.
Figure 4:
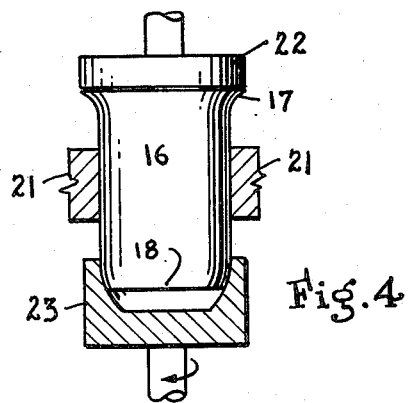
Fig. 4 shows another step in forming the item.

In Fig. 3 a piece of thin walled nylon tubing 20 may be clamped in a suitable clamp or jig 21 in the position shown, and a shaped tool 22 brought down and rotated at a suitable high speed (1750 r.p.m. for example). This downward motion and rotation will cause the upper lip to expand to the shape of the tool 22. Thereafter, or simultaneously, another cup shaped tool 23 may be brought to the position shown in Fig. 4 to form the restricted outlet 18. Thus a blow tube 16 with ends 17 and 18 can be formed from precut tubes 20 at a very high production rate. Obviously automatic means can be devised to even further speed up production thereof.

Present extrusion practice for forming nylon require heats in a range of 450 to 600 degrees Fahrenheit. The present method requires no heat other than that of friction between the tools 22 and 23 and the ends of the nylon tube 20. It appears that the combined relative rotation of the tools and the tube causes cold flow of the nylon above the elastic limit of the nylon, thereby to result in permanent rearrangement of the molecules thereof. It is believed obvious that some degree of heat will still further speed this flow phenomenon. Such heat can readily be supplied by the tools 22 and 23 by more or less insulation or radiation surfaces on same; which is a further advantage of the present invention. Further, any known heating means can be used for heating the tools and/or the tube 20 if desired. Removal of the finished blow tube 20 presents no problem with the present method, due to the rotation of the tool, which constitutes a further advantage in keeping with the objects of my present invention.

Figure 5:
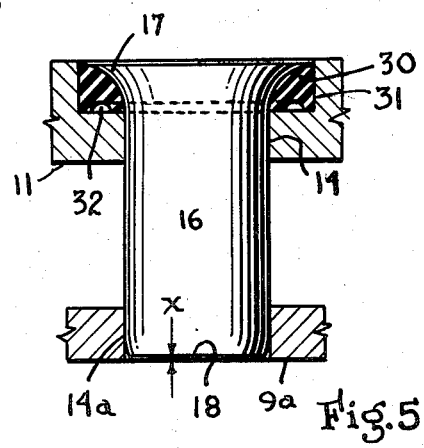
Fig. 5 shows a modification.

In Fig. 5 a blow tube 16 has its inlet flange 17 in engagement with a rubber or rubberlike insert 30 snugly fitting a shouldered recess 31 in the blow plate 11. Such recesses are presently supplied for some types of blow tubes as set forth in one or more of the above patents. Rubber is relatively incompressible, per se, in the range of pressures present in core blowing machines (in the order of 100 pounds per square inch) and accordingly an annular groove 32 is provided in the insert 30. This groove 32 provides additional sealing as well as permits of precisely controllable movement of the blow tube 16 up and down through a range of movement X. By providing suitable clearance in the groove 32 this range of movement may be held between five and ten thousandths of an inch for example. Thus for very small movement a very small groove 32 is provided. For large movement, one or more large grooves may be provided. To facilitate snap off of stems precisely at the lower lip 18, the fit of the tube 16 in holes 14 and 14a may be a close slip fit.

The insert 30 has a maximum effective area in compression equal to the area lying between its inner and outer diameters. The groove 32 may be vented to atmosphere (not shown) or may constitute the effective area with an entrapped gas, or be evacuated. Because the flange 17 protects the insert from abrasion, the same may be selected for long life and be cemented in place for accurate compressibility under severe operating conditions in which present inserts cannot endure for appreciable or economical lengths of operation while retaining a suitable range of movement due to pressure or flow friction through the tube.

The present combination of an abrasion resistant tube (of nylon for example) and a rubber insert formed for closely controllable tube movement for snapping off stems provides a further advantage of this invention. The vibration of the tube may be damped to some extent, however the longitudinal movement will augment the snap off of core stems to close tolerances not heretofore possible. In addition, the inserts may serve as adapters for my nylon tube to existing core boxes to prolong the life of blow tubes therein.

While I have shown and described in some detail preferred embodiments of a blow tube, and method of making same, obviously other variations will occur to others skilled in the art. Hence, I wish to be limited only by the scope of the following claims.

I claim:

1. In a core blowing machine; a blow tube fabricated from a single tubular piece of plastic material; said piece being formed to provide an outlet portion having an inwardly flared outlet lip of lesser diameter than other portions of said piece, said outlet lip being positioned at only a relatively short distance along said outlet portion; and support means for said piece spaced from said outlet portion, which spacing causes vibrations to be produced during use of said blow tube.

2. In a core blowing machine; a blow tube fabricated from a single piece of nylon tube; said piece being formed to provide an outlet portion having an inwardly flared outlet lip of lesser diameter than other portions of said piece, said outlet lip being positioned at only a relatively short distance along said outlet portion; and support means for said piece spaced from said outlet portion, which spacing causes vibrations to be produced during use of said blow tube.

3. In a core blowing machine; a blow tube fabricated from a single piece of nylon tube; said piece being formed to provide an outlet portion having an inwardly flared outlet lip of lesser diameter than other portions of said piece, said outlet lip being positioned at only a relatively short distance along said outlet portion; and support means for said piece comprising an outwardly flared portion of said piece spaced from said outlet portion, which spacing causes vibrations to be produced during use of said blow tube.

4. In a core blowing machine; a blow tube fabricated from a single piece of nylon tube; said piece being formed to provide an outlet portion having an inwardly flared outlet lip of lesser diameter than other portions of said piece, said outlet lip being positioned at only a relatively short distance along said outlet portion; and support means for said piece comprising an outwardly flared portion of said piece spaced a predetermined distance from said outlet portion, which spacing causes vibrations of predetermined periodicity to be produced during use of said blow tube.

5. In a core blowing machine; a blow tube fabricated from a single piece of nylon tube of predetermined diameter; said piece being formed to provide an outlet portion having an inwardly flared outlet lip of lesser diameter than other portions of said piece, said outlet lip being positioned at only a relatively short distance along said outlet portion; and support means for said piece comprising an outwardly flared portion of said piece spaced a predetermined distance from said outlet portion, which spacing and diameter of said piece causes vibrations of predetermined periodicity to be produced during use of said blow tube.

References Cited in the file of this patent

UNITED STATES PATENTS

| | | |
|---|---|---|
| 1,189,822 | House | July 4, 1916 |
| 1,385,431 | De Olaneta | July 21, 1921 |
| 1,451,010 | Clark | Apr. 10, 1923 |
| 1,535,380 | Skeppstedt | Apr. 28, 1925 |
| 2,246,086 | Austin | June 17, 1941 |
| 2,336,384 | Baker et al. | Dec. 7, 1943 |
| 2,636,230 | Morton | Apr. 28, 1953 |
| 2,682,690 | Worthington | July 6, 1954 |
| 2,791,013 | Demmler | May 7, 1957 |

FOREIGN PATENTS

| | | |
|---|---|---|
| 508,800 | Canada | Jan. 4, 1955 |

OTHER REFERENCES

Modern Plastics, August 1956, pages 151–156 relied on.

Modern Castings, October 1956, volume 30, No. 4, pages 41–56 relied on.